Patented Dec. 12, 1922.

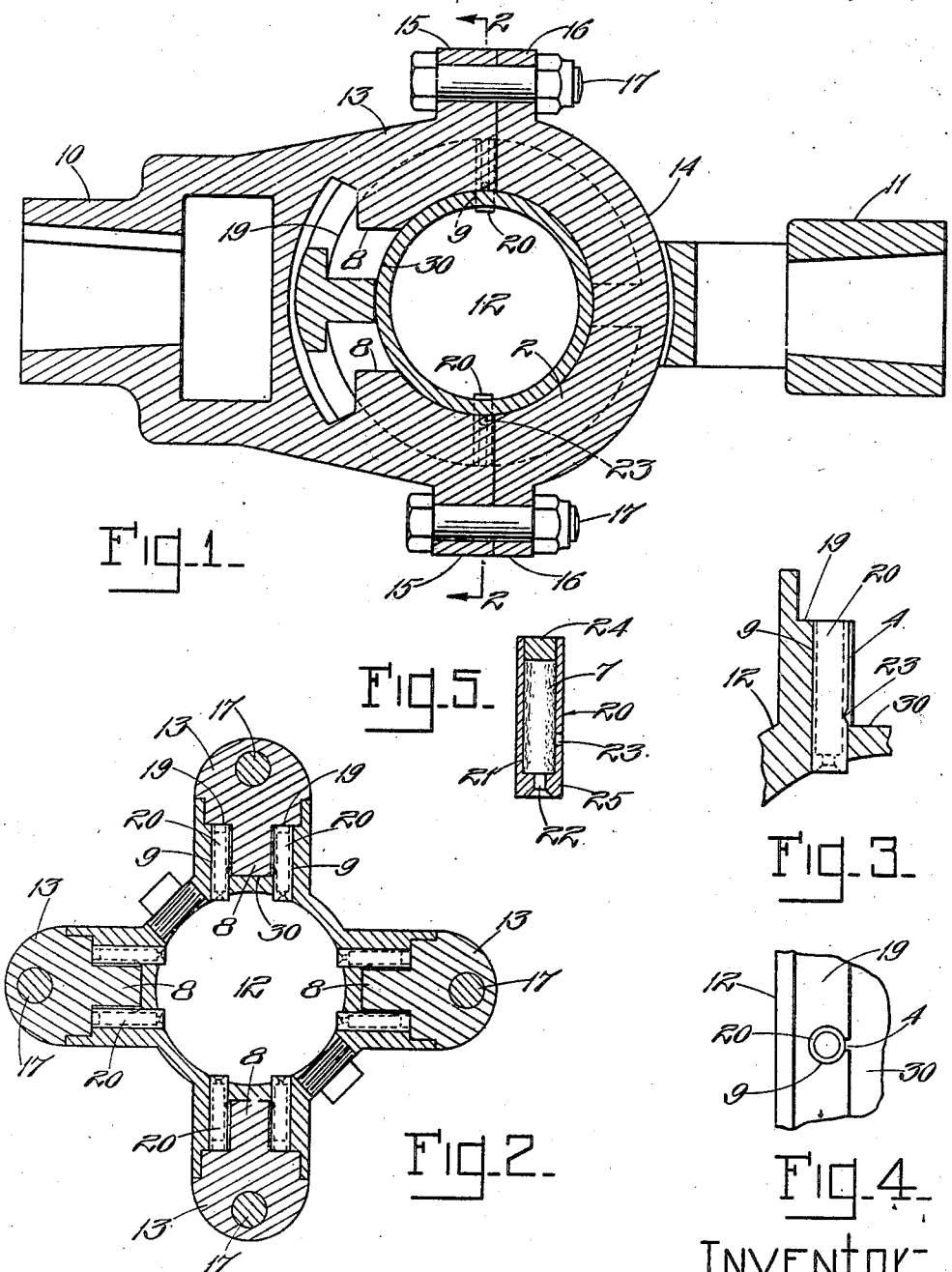

1,438,605

UNITED STATES PATENT OFFICE.

DUNCAN MacTAVISH, OF SWAMPSCOTT, MASSACHUSETTS, ASSIGNOR TO CARROLL H. RICHARDS, OF NEWTON, MASSACHUSETTS.

LUBRICANT FEED FOR UNIVERSAL JOINTS.

Application filed November 12, 1920. Serial No. 423,583.

*To all whom it may concern:*

Be it known that I, DUNCAN MACTAVISH, a citizen of the United States, residing at Swampscott, county of Essex, State of Massachusetts, have invented a certain new and useful Improvement in Lubricant Feeds for Universal Joints, of which the following is a specification, reference being had therein to the accompanying drawings.

The invention relates to a lubricant feed. It is especially intended for application to universal joints, more particularly to that class which are employed to connect two shafts and in which the joint comprises a spherical hollow member for holding a lubricant and two coupling elements for connection respectively with two shafts. The invention is not limited, however, to its application to a universal joint. In Letters Patent, No. 960,327, granted June 7, 1910, to Lewis M. Hosea, there is shown a universal joint with a hollow spherical member formed with minute apertures through which the oil is driven by centrifugal force during the rotation of the shaft and joint. It has been found that although these apertures were made very minute, yet being open throughout, the oil discharges too freely. An attempt has been made to overcome this objection by the use of wicks in the form of plugs which close the aperture sufficiently to prevent the discharge of oil in jets or spray, and yet permit the slow feeding of the oil by capillary attraction. In such previous construction the transmission of the oil throughout the wicks to the portions which are to be lubricated is by rubbing contact of the wick on the moving surface of the parts which are to be lubricated. One objection to this form of construction is it occasions a flattening and wearing of the surface of the wick which has a rubbing contact with the metallic surface which is to be lubricated, and also the rubbing produces a glaze on the wick which after a time prevents, or at least retards or diminishes too greatly, the feeding of the lubricant. The object of the present invention is to utilize a wick but to provide a cartridge holder therefor which protects the wick against abrasion or coming in direct contact with the parts to be lubricated, yet permits a sufficient flow of the lubricant for all purposes required. Another advantage of the cartridge holder is that it enables the wick to be compact and made more uniform in its density. Still another advantage is that by the use of a cartridge holder embodying my invention cup grease may be employed as a lubricant instead of oil and the feed will be automatically regulated by the speed of the engine. The greater the speed of the engine, the more lubricant is needed, and by the use of my invention if cup grease is employed, the greater the speed of the engine, and therefore more rapid the revolution of the universal joint, the more freely will the lubricant be fed, because the heat generated will warm the grease and cause it to flow more freely, and when the engine slows down the lubricant holder will begin to cool off and the grease will thicken and flow less freely.

The invention will be fully understood from the following description when taken in connection with the accompanying drawings, and the novel features thereof will be pointed out and clearly defined in the claims at the close of this specification.

In the drawings, Fig. 1 is a sectional view of a universal joint employing a cartridge enclosed wick embodying the invention.

Fig. 2 is a section on line 2—2 of Fig. 1.

Fig. 3 is a detail sectional view showing the wick cartridge installed in the ball member of the joint.

Fig. 4 is a plan view of the parts shown in Fig. 3.

Fig. 5 is a detail view of the wick and its holder.

Referring now to the drawings, 10 and 11 represent the shanks of two bifurcated coupling elements, and 12 represents the spherical lubricant holder with which said bifurcated elements are connected. Each of the two shank members 10, 11 is constructed for engagement with contiguous ends of two shafts, not shown, which are to be connected together by the joint. The two coupling elements 10, 11 are duplicates of each other and are connected in like manner with the hollow sphere or ball 12, but the jaws of one coupling element lie in a plane at an angle of 90° from the plane in which the jaws of the other coupling element lie.

The coupling elements 10 and 11 are each formed with two similar jaws 13—13, each having an inner periphery on the arc of a circle, and the outer ends of said two jaws 13—13 are connected by a semi-circular strap 14 whose inner periphery combines with the inner periphery of the two jaws 13—13 to encircle the ball 12. The jaws 13—13 are formed respectively with lugs 15—15 at their outer ends and the strap 14 is formed with lugs 16—16 at its ends, whose faces engage the faces of the lugs 15—15 respectively. The strap is detachably connected with the jaws by bolts 17 which pass through the lugs of the jaws and strap.

The combined jaws and strap have a tongue and groove connection with the ball 12 by a sliding fit. The preferred form is to provide the ball with grooves and to provide the jaws and strap with tongues.

In the form shown in the drawings, the jaws 13 are each formed with tongues 8 on the arc of a circle concentric with the periphery of the ball, and the ball is formed with parallel peripheral flanges 19—19 forming between them a groove 30 within which the tongues 8 have a sliding fit. The strap 14 is also formed with tongues 2 which form a sliding fit in groove 30.

The ball is formed with a plurality of apertures 9 which extend through the periphery of the ball and through the ribs or flanges 19—19. Said apertures where they pass through the flanges 19 cut through the inner face of the flange, as shown in Figure 4, to intersect the groove 30 between the flanges, thus forming a narrow slit 4 through the walls of the flanges into the grooves 30 which are engaged by the tongues 2 and 8.

In each of the apertures 9 is inserted tightly a cartridge 20 containing one of the wicks 7. This cartridge as shown in detail in Figure 5 comprises a hollow cylinder, preferably metal, having an interior chamber 21 into which leads an inlet passage 22 from the lower end of the cylinder, preferably through the base 25 as shown. This passage should be of small diameter. An outlet aperture 23 leads from the chamber 21 near the lower part thereof, laterally through the side wall of the cylinder. The other end of the cylinder is originally made open for the insertion of the wick 7. The wick 7 is of any suitable fibrous material, preferably felt, and is packed into the chamber 21 under considerable compression, so as to make it very compact. A plug 24 is then inserted into the open end of the cylinder through which the wick is introduced, and presses against the end of the wick and maintains the wick in its compact compressed condition.

The cartridge shells should fit tightly within the apertures 9, so that no lubricant will pass out between the cartridge and the wall of the aperture. The cartridge shell is of sufficient length so that its inner end will extend into the interior of the lubricant chamber of the hollow sphere, so that the lubricant can easily pass through the inlet passage 22 to contact with the lower end of the wick 7.

The outlet aperture 23 is located so that when the cartridge is inserted in position in the sphere, said aperture 23 will be outside of the exterior periphery of the spherical member, as shown in Figure 3, so that the lubricant as it seeps through the wick and passes out through the outlet port 23 will flow onto the outer periphery of the ball 12 between the flanges 19—19, and thence it will ultimately reach all of the rubbing parts which are to be lubricated. The centrifugal force during the rotation of the shaft and joint tends to throw the lubricant outwardly, thus facilitating its spreading to the various parts which are to be lubricated.

As already stated, the lubricant to be employed may either be oil or cup grease. It is an advantage, however, to use cup grease if possible because of its lower cost. It is of special advantage in connection with my invention, because not only can it be distributed but also the rapidty of the feed is controlled by the speed of rotation of the universal joint and shaft. When the rotation is rapid and the metal parts, especially the spherical lubricant holder, becomes warm by reason of the friction, and as the speed increases the friction increases, and therefore the heat increases and the grease becomes more nearly fluid, and of course as the friction increases there is need of more lubricant. As the lubricant becomes softened or thinner it feeds more easily, and moreover the increased speed of revolution increases the centrifugal force and therefore causes the more rapid feed of the lubricant for that reason. When the speed slows down the heat will be reduced and the grease in the spherical container will correspondingly begin to thicken and will flow less freely, and therefore will be less feed of the lubricant to the rubbing parts.

While I have shown and described my improved device as applied to use in universal joints, it is applicable to use as a lubricant feed in other mechanisms, and I wish it to be understood that the claims are intended to cover the lubricant feed, irrespective of the mechanism with which it may be employed.

What I claim is:—

1. A cartridge lubricant feed adapted for use in a universal joint comprising a shell having a hollow interior, a wick enclosed in said hollow interior, said shell having a small inlet aperture at one end, a plug inserted into the opposite end of the shell and bearing upon the end of said wick forcing it against the opposite end of the hollow interior of the shell, and a port leading out of the said hollow interior.

2. A universal joint having two coupling elements, an intermediate lubricant containing member having engagement therewith, said lubricant container being formed with apertures through its wall, lubricant feeding members inserted in said apertures, said lubricant feeding members extending into the interior of the said lubricant container, and passages from the lubricant feeding members to the adjacent engaging surfaces of the lubricant holder and the coupling members.

3. A cartridge lubricant-feed adapted for use in a universal joint, comprising a shell having a hollow interior, a wick enclosed in said hollow interior, said wick being composed of fibrous material compressed into compact form, said shell having a small inlet aperture at one end leading into the interior, a plug inserted into the opposite end of said shell and bearing firmly upon the end of said wick forcing it firmly against the opposite end of the hollow interior of the shell, and a port through the side wall of the shell leading out of the said hollow interior.

4. A universal joint having two coupling elements for connection respectively with two shafts, an intermediate hollow spherical member, each coupling element having two jaws and a cooperating strap member which togther encircle the spherical member and have a tongue and groove engagement with the spherical member, the spherical member being formed with a plurality of apertures through its periphery, a lubricant feeding cartridge tightly inserted in each of said apertures, each of said cartridges comprising a cartridge lubricant-feed comprising a shell having a hollow interior, a wick enclosed in said hollow interior, said shell having a small inlet aperture at one end leading into the interior, the other end of said shall being entirely closed, and a port through the side wall of the shell leading out of the said hollow interior, the apertured end of the said cartridge extending into the interior of the spherical member, said outlet port being outside of the spherical outer surface of the said spherical member, the side walls of the grooves having slots which lead to the aperture in which the cartridge is inserted, and said outlet port from the cartridge opening into the slot in the wall of the groove, whereby there is formed a free passage from the interior of the cartridge through the said outlet and slot to the grooved exterior portion of the spherical member.

5. A universal joint having two coupling elements, an intermediate hollow lubricant-containing member pivotally connected with each of said coupling elements, said container being formed with a plurality of apertures through its periphery, cartridge lubricant-feeds fitted into said apertures, each of said cartridges comprising a shell having a hollow interior, a wick enclosed in said hollow interior, the inner end of said shell extending into the interior of said container and having a small inlet aperture extending from the portion within the container into the interior of the cartridge shell in which the wick is located, the other end of said shell being closed, and a port through the side wall of the shell leading out of the hollow interior, and a passageway from said outlet port to the contacting surfaces of the coupling members.

6. A universal joint having two coupling elements, an intermediate hollow lubricant containing member, the two coupling elements having a tongue and groove engagement with said lubricant container, the said lubricant container being formed with apertures through its periphery, and a lubricant feeding cartridge inserted in each of said apertures, each cartridge comprising a shell having a hollow interior, a wick enclosed therein, said shell having an inlet and an outlet port, the inlet apertured portion of said cartridge extending into the interior of the said lubricant container, said outlet port being outside of the periphery of the lubricant container, the side walls of the grooves for the tongue and groove connection having slots which lead to said outlet port from the cartridge, whereby there is formed a passage from the interior of the cartridge to the adjacent surfaces of the cooperating tongue and groove members.

In testimony whereof I affix my signature.

DUNCAN MacTAVISH.